United States Patent [19]

Willcox

[11] 4,171,958

[45] Oct. 23, 1979

[54] ANTISTATIC HYDROCARBON OR HALOHYDROCARBON COMPOSITION

[75] Inventor: Kenneth W. Willcox, Bartlesville, Okla.

[73] Assignee: Phillips Petroleum Company, Bartlesville, Okla.

[21] Appl. No.: 848,252

[22] Filed: Nov. 3, 1977

Related U.S. Application Data

[62] Division of Ser. No. 711,028, Aug. 2, 1976, Pat. No. 4,068,054.

[51] Int. Cl.$^2$ .............................................. C10L 1/24
[52] U.S. Cl. ...................................................... 44/63
[58] Field of Search ............................ 44/63; 260/314

[56] References Cited

U.S. PATENT DOCUMENTS

| | | |
|---|---|---|
| 2,950,237 | 8/1960 | Sharp .................................. 260/314 |
| 3,240,009 | 3/1966 | Walters ................................... 44/63 |
| 3,687,863 | 8/1972 | Wacher ............................... 260/314 |
| 3,920,692 | 11/1975 | Wiersdorff et al. ................ 260/314 |

OTHER PUBLICATIONS

J. Org. Chem. 32, 476 (1967), by A. Adler, F. R. Longo and J. D. Finarelli.

*Primary Examiner*—Winston A. Douglas
*Assistant Examiner*—Y. Harris-Smith

[57] ABSTRACT

An olefin is polymerized in a hydrocarbon diluent in a turbulent reaction zone to produce particles of polymer which are substantially insoluble in the diluent. Fouling of the reactor by adherence of polymer particles to the walls of the reactor is reduced by adding to the reaction medium a composition which comprises a porphyrin compound, alone or together with a metal alkyl sulfosuccinate. This composition is also useful as an antistatic agent for liquid hydrocarbons and halohydrocarbons.

18 Claims, 1 Drawing Figure

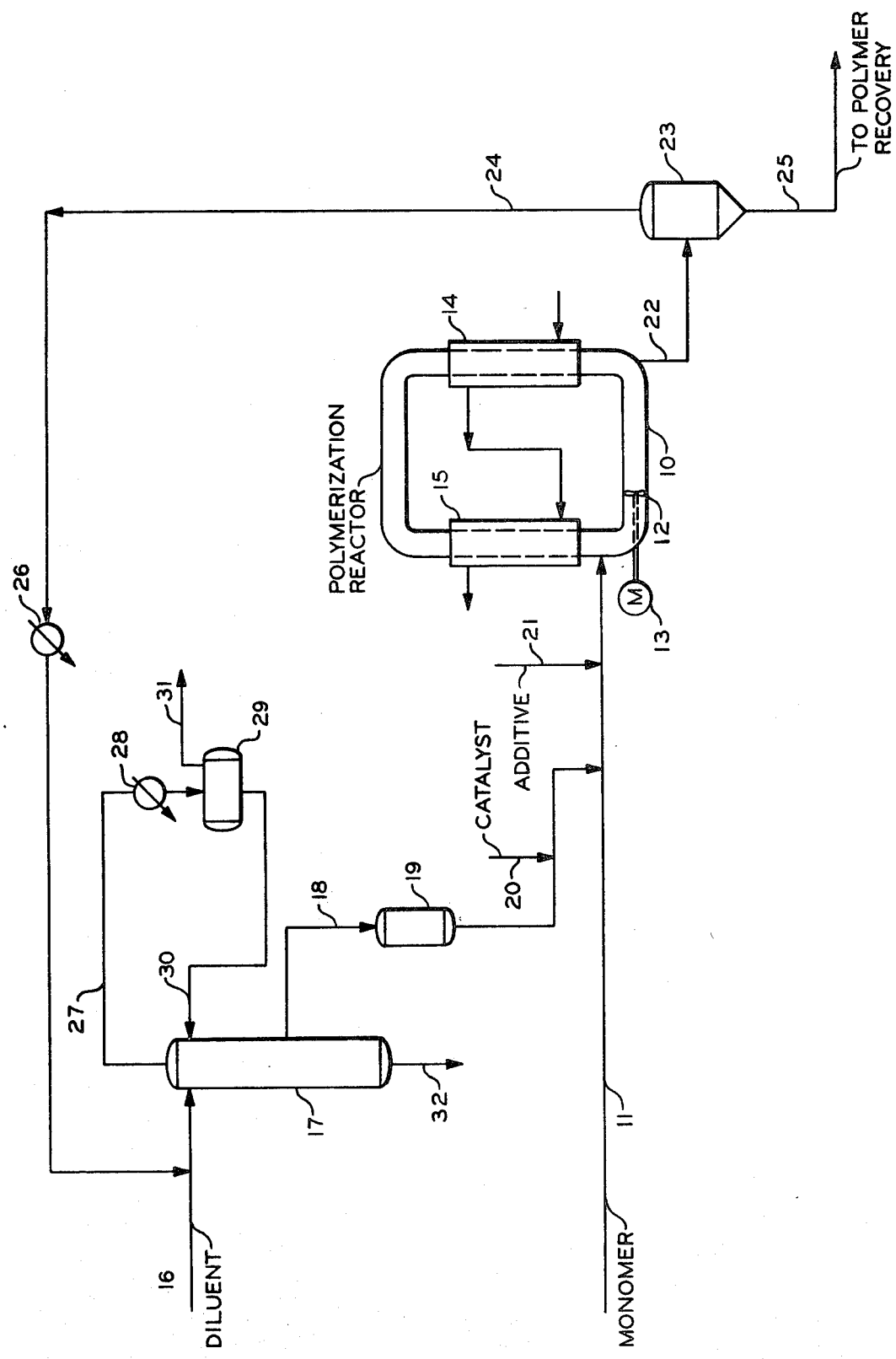

ANTISTATIC HYDROCARBON OR HALOHYDROCARBON COMPOSITION

This is a divisional of copending application, Ser. No. 711,028, filed Aug. 2, 1976, now U.S. Pat. No. 4,068,054.

It is well known that normally solid polymers of olefins can be prepared by polymerizing the olefins in a hydrocarbon diluent in a turbulent reaction zone. Such processes are frequently carried out in such a manner as to produce particles of polymer which are substantially insoluble in the diluent. These processes are often referred to as "particle-form" polymerization processes. Such processes are capable of producing polymers having high shear response, and have certain economic advantages because it is not necessary to recover polymer from a solvent. This inherently simplifies the polymer recovery procedure. However, it has been found that the polymer particles often tend to adhere to the reactor walls to reduce heat transfer. This adherence of polymer particles may result in the reactor becoming plugged.

In accordance with one embodiment of this invention, it has been found that the problem of reactor fouling in a polymerization process of the type described can be reduced or eliminated by addition to the reaction medium of a composition which comprises a porphyrin compound, alone or together with a metal alkyl sulfosuccinate.

In accordance with another embodiment of this invention, the foregoing composition is employed as an antistatic agent for use in liquid hydrocarbons and halohydrocarbons. This composition serves to increase the electrical conductivity of the hydrocarbon and thereby reduces the explosive hazard in handling the hydrocarbons. The accumulation of static electricity can be a serious problem in fueling operations, particularly with aircraft.

The accompanying drawing is a schematic representation of polymerization apparatus in which the first embodiment of this invention is particularly useful.

With reference to the drawing, olefin monomer to be polymerized is introduced into a loop reactor 10 through an inlet conduit 11. This reactor, which can be of the type described in detail in U.S. Pat. No. 3,248,179, is provided with an impeller 12 which is rotated by a motor 13. Impeller 12 serves to direct the reaction medium in a confined path through the loop reactor. The reactor is provided with jackets 14 and 15 through which a coolant can be circulated to remove heat.

Fresh diluent is introduced into the system as required through a conduit 16 which communicates with a fractionation column 17. This diluent, which can be isobutane, for example, is removed through a side stream withdrawal conduit 18 which has a dryer 19 therein. The dried diluent is added to the monomer stream introduced into reactor 10. Catalyst is added through a conduit 20, and the additive of this invention is added through a conduit 21. Polymer is withdrawn from reactor 10 through a conduit 22 which communicates with a flash tank 23. Diluent and unreacted monomer are removed from the top of flash tank 23 through a conduit 24. Polymer is removed from the bottom of flash tank 23 through a conduit 25 and passed to suitable recovery equipment.

The stream withdrawn through conduit 24 is passed through a cooler 26 and introduced into fractionation column 17. An overhead stream is withdrawn from the top of column 17 through a conduit 27 which has a condenser 28 therein. The resulting condensate is delivered to an accumulator 29, and from there is returned to column 17 as reflux through a conduit 30. Any light gases are removed through a conduit 31. Any heavy materials present are withdrawn from the bottom of column 17 through a conduit 32.

The method of this invention is applicable to the polymerization of olefins in a particle-form process wherein polymer particles are produced which are substantially insoluble in the diluent in the reactor. The invention is particularly applicable to the production of solid homopolymers of ethylene and copolymers of ethylene with another 1-olefin containing 3 to 8 carbon atoms per molecule. Exemplary copolymers include those of ethylene/propylene, ethylene/1-butene, ethylene/1-hexene and the like. Such copolymers generally comprise about 95 to 99 mol percent ethylene. As is known in the art, these polymers are particularly suited for extrusion, blow molding, injection molding and similar applications.

The foregoing polymers can advantageously be formed by use of a catalyst comprising chromium oxide associated with at least one of silica, alumina, zirconia, or thoria. Such catalysts are well known in the art and are described in U.S. Pat. No. 2,825,721, for example, the disclosure of which is herein incorporated by reference.

The particle-form process to which this invention is applicable is a process in which at least one olefin is polymerized at a temperature in the range of about 150 to about 230° F. The catalyst is maintained in suspension and is contacted with the olefin feed in an organic diluent at pressure sufficient to maintain the medium and at least a portion of the olefin in the liquid phase. The reaction conditions are such that the polymer produced is substantially insoluble in the diluent and is recovered from the reactor in the form of solid particles. The diluent is generally a paraffin or a cycloparaffin having 3 to 12 carbon atoms per molecule. Representative examples of such diluents include propane, butane, isobutane, pentane, isopentane, cyclohexane, n-dodecane, methylcyclohexane, isooctane, and the like. Pressures within the reaction zone can range from about 100 to 700 psig or higher, and catalyst concentrations can range from about 0.001 to about 1 weight percent based on the weight of the reactor contents. Hydrogen can be added to modify the molecular weight of the polymers produced if desired. Processes of this type are disclosed in British Pat. No. 853,414, complete specification published Nov. 9, 1960, and in U.S. Pat. No. 3,644,323, the disclosures of which are herein incorporated by reference.

The reactor is one in which turbulence is imparted to the reaction medium. Reactors in the form of a loop in which the reaction medium is circulated are particularly useful. As previously mentioned, such a reactor is described in U.S. Pat. No. 3,248,179, the disclosure of which is herein incorporated by reference. However, other types of reactors, such as stirred reactors, can be employed.

In accordance with one embodiment of this invention, a material is added to the polymerization reaction medium to eliminate or substantially reduce the tendency of the polymer particles to deposit on the walls of the reactor. This material comprises one or more porphyrin compounds, alone or together with one or more metal alkyl sulfosuccinates. The porphyrin compounds can have the configuration

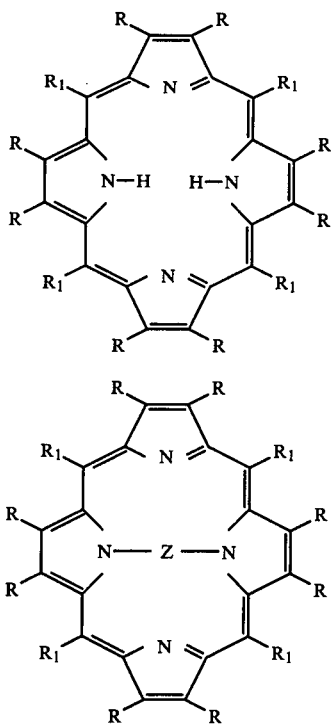

where each R is hydrogen, an alkyl group of 1 to 8 carbon atoms or a carboxy group, each $R_1$ is hydrogen, an alkyl group of 1 to 4 carbon atoms, an aromatic hydrocarbyl group of 6 to 10 carbon atoms or such an aromatic group substituted with an alkyl group of 1 to 12 carbon atoms, and Z is M or M=O, where M is copper, zinc, chromium, iron, nickel, cobalt or vanadium.

The two hydrogen-free nitrogen atoms of the compounds shown above can be protonated by bubbling hydrogen chloride or other gaseous hydrogen ion source through a solution of the porphyrin dissolved in an organic solvent such as chloroform. The resulting product can be isolated by removing the solvent by volatilization, for example. Protonation can also be accomplished in the dry state by passing hydrogen chloride gas over solid crystals of the porphyrin, but protonation of underlying molecules is more difficult to achieve in this manner.

Examplary compounds of the foregoing porphyrin, aetioporphyrin, α-β-γ-δ-tetraphenylporphyrin, octaethylporphyrin, α-β-γ-δ-tetra(p-isopropylphenyl)porphyrin, α-β-γ-δ-tetra(p-hexadecylphenyl)porphyrin, copper octaethylporphyrin, vanadyl α-β-γ-δ-tetraphenylporphyrin, diprotonated α-β-γ-δ-tetraphenylporphyrin, and the like and mixtures thereof. A presently preferred compound is diprotonated α-β-γ-δ-tetraphenylporphyrin. The α-β-γ-δ-tetraphenylporphyrins can be synthesized according to the procedure described by A. Adler, F. R. Longo, J. D. Finarelli, J. Org. Chem. 32, 476 (1967), for example.

In addition to the above-described porphyrins, the additive of this invention can include one or more alkyl sulfosuccinates containing 8 to 16 carbon atoms, wherein the metal is a metal of Group IA and IIA of the Periodic Table, see Handbook of Chemistry and Physics, Chemical Rubber Company, 45th Edition (1964). For instance, the additive of this invention can include at least one second compound comprising a calcium or sodium alkylsulfosuccinate containing 8 to 16 carbon atoms. A presently preferred commercially available compound is sodium dioctylsulfosuccinate which can be prepared by esterifying maleic anhydride with 2-ethylhexanol followed by addition of sodium bisulfite.

In addition to being employed in polymerization reactors to eliminate or reduce fouling, the foregoing materials can be added to liquid hydrocarbons and halohydrocarbons to reduce static electricity. Such liquids generally have boiling points in the range of about $-12°$ C. to 400° C., and include isobutane, normal hexane, benzene, toluene, gasoline, jet fuel, diesel fuel, kerosene, chlorobenzene, bromobenzene and the like. The porphyrins are generally more soluble in aromatic solvents than in paraffins. However, solubility in paraffins can be increased by the addition of long alkyl chains, i.e., those having from about 8 or more carbon atoms per group, to the structure. Thus, when the compounds are used in aliphatic solvents, the preferred materials are exemplified by diprotonated α-β-γ-δ-tetra(p-octylphenyl)porphyrin, diprotonated α-β-γ-δ-tetra(p-hexadecylphenyl)porphyrin and the like.

The additives of this invention are used in amounts sufficient to at least double and preferably increase at least fivefold the electrical conductivity of the organic liquids with which they are mixed as measured at about 25° C. and about one atmosphere and expressed in terms of picomho/m (conductivity unit). The porphyrins are generally added in amounts ranging from about 0.1 to about 500 parts per million (ppm) by weight of reactor diluent or hydrocarbon. The sulfosuccinate, when used, ranges from about 0.5 to about 100 ppm. Although greater quantities of the additives can be employed, this is not necessary.

EXAMPLE

The effect on the conductivity of a hydrocarbon (solvent) containing a dissolved porphyrin, some in combination with dissolved sodium dioctylsulfosuccinate, was measured at room temperature (25° C.) and nominal atmospheric pressure and reported in terms of conductivity units. One conductivity unit is 1 picomho/m. The compounds and hydrocarbon solvents used and the results obtained are given in the following table.

TABLE

Effect of Conductivity of Hydrocarbons Containing Porphyrins

| Run No. | Compounds | Abbreviation | Concentration[b] (ppm) | Solvent | Conductivity Units |
|---|---|---|---|---|---|
| 1 | None (control) | — | — | n-hexane | 0.21–1.0 |
| 2 | None (control) | — | — | isooctane | 0.1 |
| 3 | None (control) | — | — | toluene | 0.6 |
| 4 | Sodium dioctylsulfosuccinate | AOT | 1 | toluene | 33 |
| 5 | Sodium dioctylsulfosuccinate | AOT | 10 | toluene | 76 |

TABLE-continued
Effect of Conductivity of Hydrocarbons Containing Porphyrins

| Run No. | Compounds | Abbreviation | Concentration[b] (ppm) | Solvent | Conductivity Units |
|---|---|---|---|---|---|
| 6 | Sodium dioctylsulfosuccinate | AOT | 100 | toluene | 185 |
| 7 | Sodium dioctylsulfosuccinate | AOT | 1000 | toluene | 1475 |
| 8 | Octaethylporphyrin | $H_2OEP$ | 10 | toluene | 40 |
| 9 | Diprotonated $H_2OEP$ | $H_4OEP^{++}$ | 10 | toluene | 290 |
| 10 | α-β-γ-δ-tetraphenylporphyrin | $H^4TPP$ | 1 | toluene | 5.0 |
| 11 | α-β-γ-δ-tetraphenylporphyrin | $H_2TPP$ | 10 | toluene | 30 |
| 12 | α-β-γ-δ-tetraphenylporphyrin | $H_2TPP$ | 10 | isooctane | 0.4 |
| 13 | Diprotonated $H_2TPP$[a] | $H_2TPP^{++}$ | 1 | toluene | 105 |
| 14 | Diprotonated $H_2TPP$[a] | $H_2TPP^{++}$ | 100 | toluene | 2430 |
| 15 | Diprotonated $H_2TPP$[a] | $H_2TPP^{++}$ | 10 | isooctane | 6.0 |
| 16 | Tetraisopropyl $H_2TPP$ | $H_2iPTPP$ | 1 | toluene | 2 |
| 17 | Diprotonated $H_2iPTPP$ | $H_4iPTPP^{++}$ | 1 | toluene | 86 |
| 18 | $H_2TPP$ and AOT | — | 1 and 1 | toluene | 360 |
| 19 | $H_4TPP^{++}$ and AOT | — | 1 and 1 | toluene | 170 |
| 20 | $H_4iPTPP^{++}$ and AOT | — | 1 and 1 | toluene | 3870 |
| 21 | Copper $H_2OEP$ | CuOEP | 10 | toluene | 10 |
| 22 | Nickel $H_2OEP$ | NiOEP | 10 | toluene | 860 |
| 23 | Vanadyl $H_2TPP$ | VOTPP | 10 | toluene | 710 |
| 24 | $H_2TPP$ | — | 10 | toluene | 92 |
| 25 | $H_4TPP^{++}$ | — | 10 | toluene | 2430 |
| 26 | $H_2OEP$[c] | — | 10 | toluene | 38.7 |
| 27 | VOTPP[c] | — | 10 | toluene | 706 |
| 28 | NiOEP[c] | — | 10 | toluene | 857 |

[a]Runs 13-28 expressed in this fashion to conserve space in table.
[b]Parts per million, by weight, based on solvent.
[c]Measured at 20° C. rather than 25° C.

The results show the the poor conductivity of several liquid hydrocarbons can be increased by the addition of a small amount of a porphyrin. Compare, for example, in toluene the 0.6 conductivity unit value of control Run 3 with the value of 105 in Run 13 with the addition of 1 ppm $H_4TPP^{++}$, and the value of 2430 in Run 14 with the addition of 100 ppm $H_4TPP^{++}$. When either unprotonated or protonated porphyrin was combined with AOT, the values obtained can exceed the sum of the values for each additive alone. The expected value for 1 ppm $H_4TPP^{++}$ would be about 105 as shown in Run 13, and the expected value for 1 ppm AOT would be 33 as shown in Run 4 with an expected total of about 138 conductivity units. The actual value obtained using 1 ppm $H_4TPP^{++}$ and 1 ppm AOT was substantially higher (170), as shown in Run 19.

In another comparison, the expected value for 1 ppm $H_4iPTPP^{++}$ would be 86 as shown in Run 17 and the expected value for 1 ppm AOT would be 33 as shown in Run 7 with an expected total of 119. The actual value obtained at 1 ppm of each additive was about 3870 in Run 20 or about 32 times as large.

The metalloporphyrins, particularly the nickel and vanadyl derivatives shown in Runs 21 and 22 are quite effective in small amounts (10 ppm) in increasing the conductivity of toluene.

While this invention has been described in conjunction with presently preferred embodiments, it obviously is not limited thereto.

What is claimed is:
1. A composition comprising:
(a) a liquid hydrocarbon or halohydrocarbon having a boiling point in the range of about −12° to 400° C.;
(b) at least one compound selected from the group consisting of

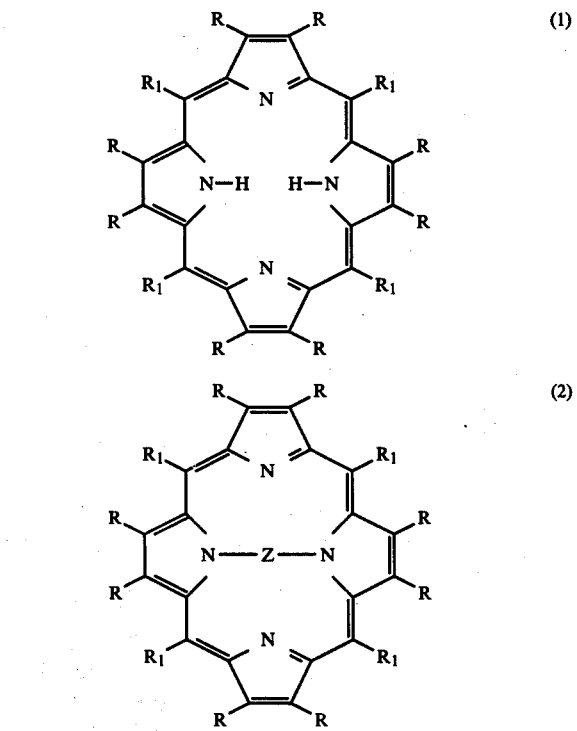

and (3) a compound of either of the foregoing structures having the hydrogen-free nitrogen atoms protonated, where each R is hydrogen, an alkyl group of 1 to 8 carbon atoms or a carboxy group, each $R_1$ is hydrogen, an alkyl group of 1 to 4 carbon atoms, an aromatic hydrocarbyl group of 6 to 10 carbon atoms or such an aromatic group substituted with an alkyl group of 1 to 12 carbon atoms, and Z is M or M═O, where M is copper, zinc, chromium, iron, nickel, cobalt or vanadium, said at least one compound being present in the composition in an amount such as to at least double the electrical conductivity of said liquid hydrocarbon or halohydrocarbon as measured in conductivity units at a temperature of 25° C.; and (c) at least one second compound comprising a calcium or sodium alkyl sulfosuccinate containing 8 to 16 carbon atoms.

2. A composition comprising:
  (a) a liquid hydrocarbon or halohydrocarbon having a boiling point in the range of about −12° to 400° C.;
  (b) at least one compound selected from the group consisting of

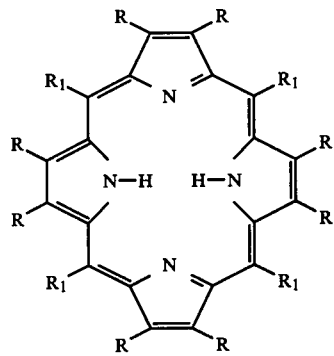

(1)

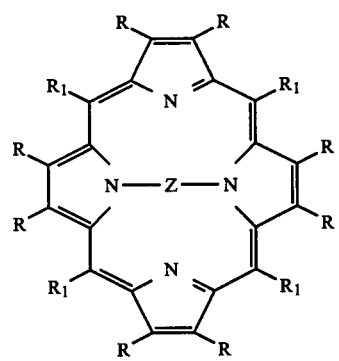

(2)

and (3) a compound of either of the foregoing structures having the hydrogen-free nitrogen atoms protonated, where each R is hydrogen, an alkyl group of 1 to 8 carbon atoms or a carboxy group, each $R_1$ is hydrogen, an alkyl group of 1 to 4 carbon atoms, an aromatic hydrocarbyl group of 6 to 10 carbon atoms or such an aromatic group substituted with an alkyl group of 1 to 12 carbon atoms, and Z is M or M=O, where M is copper, zinc, chromium, iron, nickel, cobalt or vanadium, said at least one compound being present in the composition in an amount in the range of about 0.1 to 500 parts by weight per million parts of liquid hydrocarbon or halohydrocarbon; and (c) at least one second compound comprising a calcium or sodium alkyl sulfosuccinate containing 8 to 16 carbon atoms, said at least one second compound being present in the composition in an amount within the range of 0.5 to 100 parts by weight per million parts of liquid hydrocarbon or halohydrocarbon.

3. The composition of claim 2, wherein said sulfosuccinate is sodium dioctylsulfosuccinate and wherein said liquid is a hydrocarbon.

4. The composition of claim 2 wherein said compound of (b) is octaethylporphyrin.

5. The composition of claim 2 wherein said compound of (b) is diprotonated octaethylporphyrin.

6. The composition of claim 2 wherein said compound of (b) is α-β-γ-δ-tetraphenylporphyrin.

7. The composition of claim 2 wherein said compound of (b) is diprotonated α-β-γ-δ-tetraphenylporphyrin.

8. The composition of claim 2 wherein said compound of (b) is tetraisopropyl α-β-γ-δ-tetraphenylporphyrin.

9. The composition of claim 2 wherein said compound of (b) is diprotonated tetraisopropyl α-β-γ-δ-tetraphenylporphyrin.

10. The composition of claim 2 wherein said compound of (b) is copper octaethylporphyrin.

11. The composition of claim 2 wherein said compound of (b) is nickel octaethylporphyrin.

12. The composition of claim 2 wherein said compound of (b) is vanadyl α-β-γ-δ-tetraphenylporphyrin.

13. A composition comprising:
  (a) a liquid hydrocarbon or halohydrocarbon having a boiling point in the range of about −12° to 400° C., and
  (b) at least one compound having the formula

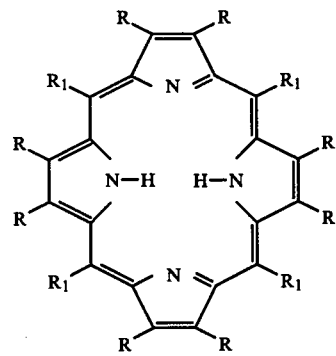

(1)

wherein the hydrogen-free nitrogen atoms are protonated, wherein each R is hydrogen, an alkyl group of 1 to 8 carbon atoms or a carboxy group, each $R_1$ is hydrogen, an alkyl group of 1 to 4 carbon atoms, an aromatic hydrocarbyl group of 6 to 10 carbon atoms or an aromatic group substituted with an alkyl group of 1 to 12 carbon atoms, said compound being present in the composition in an amount 0.1 to 500 parts by weight per million parts by weight of said liquid hydrocarbon or halohydrocarbon.

14. A composition according to claim 13 wherein said compound of (b) is diprotonated octaethylporphyrin, and said liquid is a hydrocarbon.

15. A composition according to claim 13 wherein said compound of (b) is diprotonated α-β-γ-δ-tetraphenylporphyrin, and wherein said liquid is a hydrocarbon.

16. A composition according to claim 13 wherein said compound of (b) is diprotonated tetraisopropyl tetraphenylporphyrin, and said liquid is a hydrocarbon.

17. A composition according to claim 15 containing in addition sodium dioctylsulfosuccinate.

18. A composition according to claim 16 containing in addition sodium dioctylsulfosuccinate.

* * * * *